United States Patent Office 3,222,380
Patented Dec. 7, 1965

3,222,380
NITROSOCHLORIDE DERIVATIVES OF BICYCLO
[2.2.1]-2-HEPTENE
David T. Manning and Harry A. Stansbury, Jr., South Charleston, W. Va., assignors to Union Carbide Corporation, a corporation of New York
No Drawing. Filed Apr. 3, 1961, Ser. No. 99,989
9 Claims. (Cl. 260—346.3)

The invention relates to nitrosochloride derivatives of electronegatively-substituted bicyclo[2.2.1]-2-heptene, their alpha-chloro ketoxime rearrangement products, and to the novel processes for the preparation of these compositions. The process for preparing the nitrosochloride derivatives of the invention comprises contacting a bicyclo [2.2.1]-2-heptene derivative that is represented by Formula I (I)
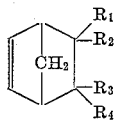

wherein $R_1$ is hydrogen or a lower alkyl radical having from one to four carbon atoms, $R_2$ is hydrogen, lower alkyl having from one to four carbon atoms, aryl, or X, $R_3$ is hydrogen, lower alkyl having from one to four carbon atoms, aryl, or X, and $R_4$ is hydrogen or a lower alkyl radical having from one to four carbon atoms, wherein X is an electron-withdrawing or electronegative radical, and wherein at least one of the variables designated as $R_2$ and $R_3$ is X; with nitrosyl chloride, for a period of time sufficient to produce the nitrosochloride of said bicyclo[2.2.1]-2-heptene derivative.

The nitrosochloride derivatives thus prepared are novel compounds which are represented by Formula II:

(II)
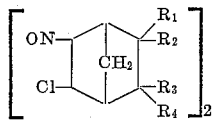

wherein $R_1$, $R_2$, $R_3$, and $R_4$ are as described above. It is pointed out that the stable form of these compounds is the dimeric form, wherein the molecules are coupled through the nitroso radicals which join to form a diazoxy radical, according to the equation

When the nitrosochlorides that are represented by Formula II are heated, they rearrange to form the novel alphachloro oximes of the invention, which are represented by Formula III:

(III)
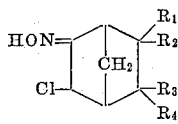

wherein $R_1$, $R_2$, $R_3$, and $R_4$ are as described above.

The process of the invention involves a reaction that is unexpected, namely the reaction of nitrosyl chloride with a bicyclo[2.2.1]-2-heptene derivative substituted with one or more electron-withdrawing radicals to produce the corresponding nitrosochloride. Although it has been known that nitrosyl chloride will add to certain olefinic double bonds to yield a nitrosochloride, the reaction has been observed to proceed with difficulty unless the double bond was activated. Such activation was found, for example, when the carbon atoms which composed the double bond were substituted with one or more phenyl or alkyl radicals. On the other hand, when the olefinic double bond was under the influence of an electron-withdrawing radical such as carboxy, cyano, nitro, or the like, nitrosyl chloride was found not to add to this double bond. One would expect, therefore, that the bicyclo [2.2.1]-2-heptene derivatives substituted with electron-withdrawing radicals, which are employed in the process of the invention, would not react with nitrosyl chloride to produce the corresponding nitrosochloride.

The derivatives of bicyclo[2.2.1]-2-heptene which are employed as starting materials in the process of the invention, are those which have electron-withdrawing radicals substituted in the 5 or in the 5 and 6 positions, and are those compounds which can be represented by Formula I, above. An electron-withdrawing radical is one which has a resonance hybrid form that has a partial negative charge, which stems from the tendency of said radical to withdraw electrons from the neighboring atoms. Exemplary of such electron-withdrawing radicals are carboxy, cyano, carbonyl, nitro, formyl, carboalkoxy, acyl, alkylsulfonyl, and the like. The variables $R_2$ and $R_3$, together with the ring carbon atoms to which they are bonded, form a cyclic acid anhydride ring when both of said variables are carbonyl radicals, in which case the carbonyl radicals are also bonded to each other by an oxygen atom.

Illustrative of the bicyclo[2.2.1]-2-heptene derivatives which are employed in the invention are:
bicyclo[2.2.1]-5-heptene-2-carbonitrile,
bicyclo[2.2.1]-5-heptene-2-carboxylic acid,
5-nitrobicyclo[2.2.1]-2-heptene,
5-formylbicyclo[2.2.1]-2-heptene,
5-carbomethoxybicyclo[2.2.1]-2-heptene,
5-carbethoxybicyclo[2.2.1]-2-heptene,
5-carbopropoxybicyclo[2.2.1]-2-heptene,
5-carbobutoxybicyclo[2.2.1]-2-heptene,
5-acetylbicyclo[2.2.1]-2-heptene,
5-propionylbicyclo[2.2.1]-2-heptene,
5-butyrylbicyclo[2.2.1]-2-heptene,
5-valerylbicyclo[2.2.1]-2-heptene,
5-methylsulfonylbicyclo[2.2.1]-2-heptene,
5-ethylsulfonylbicyclo[2.2.1]-2-heptene,
5-propylsulfonylbicyclo[2.2.1]-2-heptene,
5-butylsulfonylbicyclo[2.2.1]-2-heptene,
2-methylbicyclo[2.2.1]-5-heptene-2-carboxylic acid,
bicyclo[2.2.1]-5-heptene-2,3-dicarboxylic acid,
bicyclo[2.2.1]-5-heptene-2,3-dicarboxylic anhydride,
5-nitro-6-phenylbicyclo[2.2.1]-2-heptene,
2-methylbicyclo[2.2.1]-5-heptene-2-carbonitrile,
3-phenylbicyclo[2.2.1]-5-heptene-2-carboxylic acid,
5-acetyl-6-phenylbicyclo[2.2.1]-2-heptene, and the like. The preferred bicyclo[2.2.1]-2-heptene derivatives are bicyclo[2.2.1]-5-heptene-2-carboxylic acid, bicyclo[2.2.1]-5-heptene-2-carbonitrile, bicyclo[2.2.1]-5-heptene-2,3-dicarboxylic acid, and bicyclo[2.2.1]-5-heptene-2,3-dicarboxylic anhydride.

In the process of the invention, nitrosyl chloride is contacted with a bicyclo[2.2.1]-2-heptene derivative, such as those exemplified above, for a period of time sufficient to produce the corresponding nitrosochloride of said bicyclo-[2.2.1]-2-heptene derivative. The molar ratio of the reactants can vary from about 0.25 mole to about 2 moles of nitrosyl chloride per mole of bicyclo[2.2.1]-2-heptene derivative. The preferred molar ratio of reactants is that which employs a slight stoichiometric excess of nitrosyl chloride, that is, from about 1.0 mole to about 1.2 moles of nitrosyl chloride per mole of bicyclo[2.2.1]-2-heptene derivative. The most preferred molar ratio is about 1.05 moles of nitrosyl chloride per mole of bicyclo[2.2.1]-2-heptene derivative.

The reaction is preferably carried out in an inert, normally-liquid, organic vehicle which is a solvent for both reactants. Illustrative of the inert, normally-liquid, organic vehicles which can be employed are the chlorinated hydrocarbons such as carbon tetrachloride, chloroform, methylene dichloride, ethylene dichloride, and the like, aromatic hydrocarbons such as toluene, xylene, and the like, various ethers such as diethyl ether, diisopropyl ether, and the like, and aliphatic hydrocarbons such as pentane, hexane, heptane and the petroleum ethers. Preferred are the aliphatic hydrocarbons such as pentane and petroleum ether. The concentration of the reactants in the inert, normally-liquid, organic vehicle is not critical, and therefore can vary over a wide range. For example, a concentration in the range of from about 2 weight percent to about 50 weight percent of nitrosyl chloride and bicyclo[2.2.1]-2-heptene derivative, based on total solution weight, is suitable.

The reaction temperature can vary from about —50° C. to about +25° C. Although product will be obtained both above and below this range, at lower temperatures the reaction becomes quite slow, and at higher temperatures side-reactions begin to appear. A preferred temperature range is from about —20° C. to about +15° C., with temperatures in the range of from about —5° C. to about +10° C. being highly preferred.

In the temperature range employed in the process of the invention, the reaction between nitrosyl chloride and bicyclo[2.2.1]-2-heptene derivatives is very rapid, and therefore the reaction time is not critical. One preferred method of carrying out the process of the invention is to add nitrosyl chloride to a solution of bicyclo[2.2.1]-2-heptene derivative in an inert, normally-liquid, organic vehicle, as rapidly as is consistent with maintaining the temperature of the reaction mixture within the desired range (the reaction is exothermic). Addition times of from about 20 minutes to about 3 hours have been found to be satisfactory. It is also desirable to maintain the reaction mixture at the reaction temperature for a short time, e.g., from about 10 minutes to about one hour, after the addition of nitrosyl chloride is completed, in order to insure essentially complete reaction.

The pressure at which the reaction is carried out is not critical, and can be sub-atmospheric, atmospheric, or superatmospheric, whichever is desired.

The reaction is preferably carried out in glass or other inert, non-metallic equipment due to the corrosive properties of nitrosyl chloride. A glass-lined kettle equipped with agitator and means for cooling is satisfactory.

The nitrosochloride product of the invention, which is present in the dimeric form, precipitates out of solution as it is produced. It can be recovered, for example, by filtering the reaction mixture, washing the precipitate with an inert organic liquid such as heptane, and then drying the precipitate. If desired, further purification can be accomplished by methods such as recrystallization from, for example, acetonitrile.

The novel bicyclo[2.2.1]-2-heptene nitrosochloride derivatives which are prepared by the process of the invention are exemplified by compounds such as:

bicyclo[2.2.1]-5-heptene-2-carbonitrile nitroscholoride,
bicyclo[2.2.1]-5-heptene-2-carboxylic acid nitrosochloride,
5-nitrobicyclo[2.2.1]-2-heptene nitrosochloride,
5-formylbicyclo[2.2.1]-2-heptene nitrosochloride,
5-carbomethoxybicyclo[2.2.1]-2-heptene nitrosochloride,
5-carbobutoxybicyclo[2.2.1]-2-heptene nitrosochloride,
5-acetylbicyclo[2.2.1]-2-heptene nitrosochloride,
5-valerylbicyclo[2.2.1]-2-heptene nitrosochloride,
5-methylsulfonylbicyclo[2.2.1]-2-heptene nitrosochloride,
5-butylsulfonylbicyclo[2.2.1]-2-heptene nitrosochloride,
2-methylbicyclo[2.2.1]-5-heptene-2-carboxylic acid nitrosochloride,
bicyclo[2.2.1]-5-heptene-2,3-dicarboxylic acid nitrosochloride,
bicyclo[2.2.1]-5-heptene-2,3-dicarboxylic anhydride nitrosochloride,
5-nitro-6-phenylbicyclo[2.2.1]-2-heptene nitrosochloride,
2-methylbicyclo[2.2.1]-5-heptene-2-carbonitrile nitrosochloride,
3-phenylbicyclo[2.2.1]-5-heptene-2-carboxylic acid nitrosochloride,
5-acetyl-6-phenylbicyclo[2.2.1]-2-heptene nitrosochloride, and the like. The preferred nitrosochloride derivatives of bicyclo[2.2.1]-2-heptene are bicyclo[2.2.1]-5-heptene-2-carbonitrile nitrosochloride,
bicyclo[2.2.1]-5-heptene-2-carboxylic acid nitrosochloride,
bicyclo[2.2.1]-5-heptene-2,3-dicarboxylic acid nitroso chloride, and bicyclo[2.2.1]-5-heptene-2,3-discarboxylic anhydride nitrosochloride.

The invention is also directed toward the alphachloro ketoxime rearrangement products of the bicyclo[2.2.1]-2-heptene nitrosochloride derivatives of the invention. The novel rearrangement reaction is illustrated by the following sequence of reaction stages:

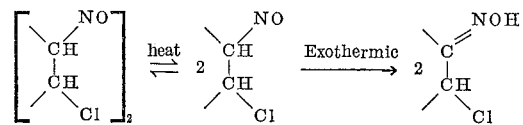

The first step in the rearrangement is the dissociation of the stable nitrosochloride dimer to the unstable monomeric form. This occurs at the temperatures above 75° C., and preferably above 105° C. The monomer then rapidly rearranges to the chloro oxime, with evolution of heat.

It is preferable to carry out the rearrangement in an inert organic vehicle that is liquid at the reaction temperature. Compounds such as n-butanol, amyl alcohol, various mono-alkyl and di-alkyl ethers of ethylene and propylene glycol, ethylene glycol, propylene glycol, and the like, can be employed as the inert organic vehicle. Also satisfactory are such N,N-dialkylamides as N,N-dimethylformamide and N,N-dimethylacetamide. Lower boiling alcohols can be employed if the reaction system is pressurized sufficiently to raise the boiling point of the organic liquid to the reaction temperature. N-butanol is the preferred organic vehicle for the reason that its boiling point at atmospheric pressure (117–118° C.) lies within the preferred reaction temperature range, and thereby makes it an easy matter to maintain the desired temperature by simple refluxing. During the course of the reaction, the relatively insoluble nitrosochloride dimer gradually dissolves, then dissociates to the monomer, which in turn rearranges to the alpha-chloro oxime.

The weight ratio of organic vehicle to starting nitrosochloride can vary from about 3:1 to about 15:1. At concentrations higher than about 3:1, the exothermic reaction may be difficult to control, and at concentrations below about 15:1, the productivity of the reaction begins to decrease.

The rearrangement is carried out at a temperature in the range of from about 75° C. to about 140° C., preferably from about 105° C. to about 125° C., and most preferably from about 115° C. to about 120° C.

The reaction time is dependent upon the nature of the particular nitrosochloride employed, reaction temperature, and other factors. It can vary from about five minutes to about three hours, and preferably is about fifteen minutes to one hour. The reaction will be substantially complete shortly (e.g.—about five minutes) after all of the nitrosochloride dimer has dissolved.

The reaction is preferably carried out at atmospheric pressure, however, either sub- or super-atmospheric pressure can be employed, depending upon the boiling point of the particular organic vehicle employed, since the most convenient way to maintain the desired reaction temperature is by refluxing the organic vehicle.

The alpha-chloro ketoxime product can be recovered and purified by standard methods, such as by distilling off the organic vehicle, followed by taking up the residue from the distillation in an organic solvent such as ethyl ether. The ether solution is then diluted with a hydrocarbon such as pentane or cyclohexane which tends to cause precipitation of by-products, leaving the desired product in solution. Treatment of the above solution with activated charcoal followed by filtration and evaporation of solvents from the filtrates gives the product as a residue, often of sufficient purity for further synthetic uses. Further purification of the residual chloro oximes may sometimes be achieved by washing with an organic solvent such as toluene or isopropyl ether which dissolves various by-products and leaves the pure crystalline alpha-chloro ketoxime. The latter may then be recovered by filtration and dried.

The alpha-chloro ketoximes which are provided by the present invention include such compounds as:

5-chloro-6-hydroxy-iminobicyclo[2.2.1]heptane-2(3)-carboxylic acid,
3-chloro-5(6)-cyanobicyclo[2.2.1]-2-heptanone oxime,
3-chloro-5(6)-nitrobicyclo[2.2.1]-2-heptanone oxime,
3-chloro-5(6)-formylbicyclo[2.2.1]-2-haptanone oxime,
3-chloro-5(6)-carbomethoxybicyclo[2.2.1]-2-heptanone oxime,
3-chloro-5(6)-acetylbicyclo[2.2.1]-2-heptanone oxime,
3-chloro-5(6)-valerylbicyclo[2.2.1]-2-heptanone oxime,
3-chloro-5(6)-methylsulfonylbicyclo[2.2.1]-2-heptanone oxime,
3-chloro-5(6)-butylsulfonylbicyclo[2.2.1]-2-heptanone oxime,
5-chloro-6-hydroxyimino-2(3)-methylbicyclo[2.2.1]heptane-2(3)-carboxylic acid,
5-chloro-6-hydroxyiminobicyclo[2.2.1]heptane-2,3-dicarboxylic acid,
5-chloro-6-hydroxyiminobicyclo[2.2.1]-heptane-2,3-dicarboxylic anhydride,
3-chloro-6(5)-nitro-5(6)-phenylbicyclo[2.2.1]-2-heptanone oxime,
3-chloro-5(6)-cyano-5(6)-methylbicyclo[2.2.1]-2-heptanone oxime,
5-chloro-6-hydroxyimino-3(2)-phenylbicyclo[2.2.1]heptane-2(3)-carboxylic acid,
5(6)-acetyl-3-chloro-6(5)-phenylbicyclo[2.2.1]-2-heptanone oxime, and the like.

The preferred alpha-chloro ketoximes are
3-chloro-5(6)-cyanobicyclo[2.2.1]-2-heptanone oxime and
5-chloro-6-hydroxyiminobicyclo[2.2.1]heptane-2(3)-carboxlyic acid.

The compositions of the invention have wide utility as reaction intermediates. To illustrate the use as reaction intermediates, both the nitrosochlorides and the alpha-chloro oximes can be reacted with ammonia to yield alpha-amino oximes, which can be used as metal-chelating agents.

The examples which follow illustrate the processes of the invention and the preparation of the compositions of the invention.

EXAMPLE 1

*Bicyclo[2.2.1]-5-heptene-2-carbonitrile nitrosochloride*

A solution of 73 grams (0.612 mole) of bicyclo[2.2.1]-5-heptene-2-carbonitrile in 300 ml. of pentane was chilled to 5° C. and 0.612 mole (28.2 ml. at −30° C.) of nitrosyl chloride added to the solution, with vigorous stirring, over a 1.66-hour period while holding the temperature at 4–9° C. with an ice bath. A heavy white precipitate began separating soon after commencing the nitrosyl chloride feed, and stirring at 6° C. was continued for 2.1 hours following completion of the feed. The precipitate was collected, washed with cold pentane and dried giving 85.7 grams of crude product, M.P. 143–146° C. This was given a preliminary purification by washing with ethanol, after which the dried product weighed 77.6 grams (68.6 percent of the theoretical).

The product was recrystallized twice from acetonitrile giving fine white crystals, M.P. 164–165° C.

*Analysis.*—Calculated for $(C_8H_9N_2OCl)_2$: C, 52.04; H, 4.91; N, 15.17; Cl, 19.20. Found: C, 51.98; H. 5.11; N, 15.41; Cl, 19.03.

The infrared analysis was consistent with the expected structure and showed bands at 4.47 microns ($C\equiv N$), 7.19 microns ($N=O$), 8.12 microns ($N=O$ dimer), and 14.55 microns (cl).

EXAMPLE 2

The reaction described in Example 1 was repeated with the following changes: the feed period and extra reaction (following the feed) period were increased to 2.0 and 2.5 hours, respectively, and the final ethanol wash was omitted. The product weighed 90.8 grams (80.3 percent of theory) and melted at 141–144°.

EXAMPLE 3

*3-chloro-5(6)-cyanobicyclo[2.2.1]-2-heptanone oxime*

A suspension of 90.8 grams of bicyclo[2.2.1]-5-heptene-2-carbonitrile nitrosochloride in 1000 ml. of n-butanol was heated under reflux (117.5° C.) for a period of 37 minutes during which time the nitrosochloride dissolved and the greenish solution became brown. During the rearrangement, some decomposition with loss of nitric oxide was evident. The reaction mixture was stripped free of solvent and the sirupy residue dissolved in 500 ml. of ethyl ether. The resulting solution was allowed to stand overnight after which some insoluble material was filtered off. The filtrate was diluted with 350 ml. of ligroin, treated with decolorizing carbon and filtered to give a clear, light-colored solution. This was evaporated under vacuum to give 74.4 grams of a yellow sirup which, when dried, contained 13.81 percent nitrogen. Since the theoretical nitrogen content for $C_8H_9N_2OCl$ is 15.17 percent, some decomposition evidently occurred. When the yellow sirup was washed with 500 ml. of isopropyl ether, part of it dissolved leaving a tan, insoluble crystalline material which weighed 22.0 grams when dry. This material, M.P. 125–135°, was found by nitrogen analysis to be the desired 3-chloro-5(6)-cyanobicyclo[2.2.1]-2-heptanone oxime.

*Analysis.*—Calculated for $C_8H_9N_2OCl$: N, 15.17. Found: N, 15.09.

The yield of desired product was 24.2 percent. Infrared analysis showed bands at 2.97 microns (NO—H), 4.46 microns ($\equiv N$), 6.03 microns ($C=N$), 10.37 and 10.5 microns (N—OH) and 14.02 microns (chlorine) and confirmed the assigned structure.

Evaporation of isopropyl ether from the filtrate left 52 grams of a light-colored viscous material containing 12.59 percent nitrogen.

EXAMPLE 4

*Bicyclo[2.2.1]-5-heptene-2-carboxylic acid nitrosochloride*

To a stirred solution of 90.0 grams (0.651 mole) of bicyclo[2.2.1]-5-heptene-2-carboxylic acid in 400 ml. of pentane was added 0.651 mole (30 ml. at −30° C.) of nitrosyl chloride over a 41-minute period while holding the temperature of the reaction at 5–10° C. by ice bath cooling. A heavy precipitate separated during the feed period and stirring at 3–4° C. was continued for a 2.5-hour period after which the precipitate was collected, washed with petroleum ether and dried to give 122.2 grams of a pale green solid, M.P. 104–115° C.

*Analysis.*—Calculated for $C_8H_{10}NO_3Cl$: C, 47.19; H, 4.95; N, 6.88; Cl, 17.41. Found: C, 47.29; H, 5.31; N, 6.90; Cl, 16.01.

Infrared analysis supported the assigned structure and showed bands at 5.85 microns (C=O) and 8.1 microns (nitroso dimer). The yield was 92.2 percent of the theoretical.

An attempt was then made to further purify a 5.0-gram sample of the crude product by recrystallization from acetonitrile. The following results were obtained:

| Crop. | Wgt. (grams) | M.P., °C. | Analysis (percent) | | | |
|---|---|---|---|---|---|---|
| | | | C | H | N | Cl |
| $C_8H_{10}NO_3Cl$ (theoretical) | | | 47.19 | 4.95 | 6.88 | 17.41 |
| 1 | 0.5 | 169–170 | 46.71 | 5.17 | 6.95 | |
| 2 | 0.5 | 158–159 | | | 7.12 | |
| 3 | 0.9 | 162–169 | 47.39 | 5.18 | 7.18 | 17.36 |

Crops 1, 2 and 3 all had bands in the infrared in the following regions:

|  | Microns |
|---|---|
| Acid hydroxyl, hydrogen-bonded | 2.8–4.0 |
| Acid carbonyl | 5.8 |
| Nitroso dimer | 8.0–8.2 |
| Chlorine | 14.7–14.8 |

EXAMPLE 5

*5-chloro-6-hydroxyiminobicyclo[2.2.1]heptane-2(3)-carboxylic acid*

A solution of 57 grams of bicyclo[2.2.1]-5-heptene-2-carboxylic acid nitrosochloride in 500 ml. of N,N-dimethylformamide was heated at 110–115° C. for a period of 26 minutes during which the original green color of the solution turned to brownish yellow. The solvent was then removed from the reaction mixture by heating under reduced pressure and the resulting dark residue (66 grams) dissolved in 800 ml. of diethyl ether. After standing for some time, the ether solution was filtered and the filtrate diluted with 400 ml. of pentane and treated with decolorizing carbon. The solution was again filtered and the clear filtrate evaporated under reduced pressure to give 59.1 grams of a clear viscous sirup containing 8.09 percent nitrogen. A 52.5-gram portion of this residue, which contained some crystalline material, was stirred with 100 ml. of toluene which dissolved the sirup and left the crystalline component in suspension. The latter was collected, washed and dried to give 13.5 grams (26.6 percent yield) of 5-chloro-6-hydroxyiminobicyclo[2.2.1]heptane-2(3)-carboxylic acid as a white crystalline solid, M.P. 149–152°.

*Analysis.*—Calculated for $C_8H_{10}NO_3Cl$: C, 47.19; H, 4.95; N, 6.88. Found: C, 47.02; H, 5.17; N, 7.06.

Infrared analysis showed bands at 3.04 microns (NO—H), 3.85 microns (acid OH), 5.85 microns (acid C=O), 8.2 microns (acid C—O), 10.35 microns (N—OH), and 14.9 microns (chlorine) and supported the assigned structure.

EXAMPLE 6

*Endo-cis bicyclo[2.2.1]-5-heptene-2,3-dicarboxylic acid nitrosochloride*

To a stirred mixture of 132 grams (0.724 mole) of endo-cis bicyclo[2.2.1]-5-heptene-2,3-dicarboxylic acid and 3500 ml. of ethyl ether was added 0.8 mole (37.1 ml. at −30°) of nitrosyl chloride over a 1.2-hour period at a temperature of 8–12° C., maintained by external cooling. The reaction mixture was then stirred at 15–27° for a period of 20.5 hours and the white, crystalline nitrosochloride collected and dried to give 78.2 grams (43.6 percent yield), M.P. 136°.

An analytical sample of endo-cis bicyclo[2.2.1]-5-heptene-2,3-dicarboxylic acid nitrosochloride, M.P. 138°, was obtained from another run, performed under essentially identical conditions, in 37.6 percent yield.

*Analysis.*—Calculated for $C_9H_{10}NClO_5$: C, 43.65; H, 4.36; N, 5.66. Found: C, 44.28; H, 4.59; N, 5.31.

The infrared spectrum was consistent with the expected product.

EXAMPLE 7

*Endo-cis bicyclo[2.2.1]-5-heptene-2,3-dicarboxylic anhydride nitrosochloride*

To a stirred solution of 70.0 grams (0.426 mole) of endo-cis bicyclo[2.2.1]-5-heptene-2,3-dicarboxylic anhydride (M.P. 162–163°) in 3000 ml. of ethyl ether was added 0.427 mole (19.7 ml. at −30°) of nitrosyl chloride over a 40-minute period while maintaining a temperature of 10–15° with a cooling bath. The reaction mixture was then stirred at room temperature for a 24-hour period after which the product was collected, washed with ether and dried to give 53.9 grams (55.2 percent yield) of the desired nitrosochloride as a white solid, M.P. 158–159°. Washing with hot benzene raised the melting point to 162°.

*Analysis.*—Calculated for $C_9H_8NClO_4$: C, 47.08; H, 3.51; N, 6.10. Found: C, 47.02; H, 3.58; N, 6.09.

Infrared analysis was in agreement with the expected product. Evaporation of the filtrate left 24.6 grams of crude unreacted starting material.

EXAMPLE 8

*3-chloro-5(6)-cyanobicyclo[2.2.1]-2-heptanone oxime*

A suspension of 25.0 grams of bicyclo[2.2.1]-5-heptene-2-carbonitrile nitrosochloride in 250 ml. of the diethyl ether of ethylene glycol was heated under reflux (116–118°) for a period of 1.58 hours. At the end of this time the clear orange solution was stripped under vacuum to give 24.8 grams of a dark brown sirup which was then dissolved in 300 ml. of ethyl ether. The ether solution was filtered, diluted with 250 ml. of pentane and treated with decolorizing carbon. Filtration and evaporation of solvents left 20.7 grams of a light yellow sirup having the following analysis:

*Analysis.*—Calcd. for $C_8H_9N_2OCl$: C, 52.04; H, 4.91; N, 15.17. Found: C, 53.20; H, 5.37; N, 14.10.

Since the analysis suggested the presence of unremoved diethyl ether of ethylene glycol, the residue was dissolved in ethyl ether and reprecipitated by adding a large volume of pentane. The supernatant solvent mixture was decanted off and discarded. After vacuum drying, the new residue, which had partially crystalized, weighed 10.2 grams (40.8 percent yield).

*Analysis.*—Calcd. for $C_8H_9N_2OCl$: C, 52.04; H, 4.91; N, 15.17. Found: C, 52.16; H, 5.14; N, 15.27.

The above reaction was then repeated on a larger (250 gram) scale, employing a reaction time of 2.13 hours at 112°. The reaction mixture was worked up in a similar manner to give, after final drying, 164 grams (65.6 percent yield) of orange sirupy product.

*Analysis.*—Calcd. for $C_8H_9N_2OCl$: N, 15.17. Found: N, 14.52.

What is claimed is:

1. Bicyclo[2.2.1]-5-heptene-2 - carbonitrile nitrosochloride.

2. Bicyclo[2.2.1]-5-heptene-2-carboxylic acid nitrosochloride.

3. Bicyclo[2.2.1]-5-heptene - 2,3 - dicarboxylic acid nitrosochloride.

4. Bicyclo[2.2.1]-5-heptene-2,3-dicarboxylic anhydride nitrosochloride.

5. 5-chloro-6 - hydroxyiminobicyclo[2.2.1]heptane - 2-carboxylic acid.

6. 5-chloro-6 - hydroxyiminobicyclo[2.2.1]heptane - 3-carboxylic acid.

7. 3-chloro-5-cyanobicyclo[2.2.1]-2-heptanone oxime.

8. 3-chloro-6-cyanobicyclo[2.2.1]-2-heptanone oxime.

9. A compound selected from the group consisting of compounds of the formula:

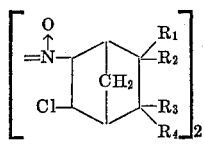

and

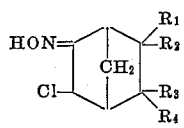

wherein each $R_1$ and $R_4$ individually is a member selected from the group consisting of hydrogen, alkyl of from 1 to 4 carbon atoms, and phenyl, and wherein each $R_2$ and $R_4$ individually is a member selected from the group consisting of hydrogen, alkyl of from 1 to 4 carbon atoms, and X, wherein X is selected from the group consisting of carboxy, cyano, and two X variables taken together to form carbonyloxycarbonyl, provided that at least one of the variables designated as $R_2$ and $R_3$ represents an X.

References Cited by the Examiner

Beckham et al.: Chemical Reviews, volume 48 (1951), pages 353, 372–4.

NICHOLAS S. RIZZO, *Primary Examiner.*

IRVING MARCUS, *Examiner.*